(12) United States Patent
Souther

(10) Patent No.: US 6,866,086 B2
(45) Date of Patent: Mar. 15, 2005

(54) SOLID FORM SEAT BELT BUCKLE AND ESCAPE TOOL

(76) Inventor: Douglas F. Souther, 1238 E. Alice, Phoenix, AZ (US) 85020

( * ) Notice: Subject to any disclaimer, the term of this patent is extended or adjusted under 35 U.S.C. 154(b) by 84 days.

(21) Appl. No.: 10/348,720

(22) Filed: Jan. 22, 2003

(65) Prior Publication Data

US 2004/0140589 A1 Jul. 22, 2004

(51) Int. Cl.⁷ .............................................. B22D 13/00
(52) U.S. Cl. ................ 164/113; 164/312.119
(58) Field of Search .............. 164/113, 900, 164/119, 312, 120

(56) References Cited

U.S. PATENT DOCUMENTS

| 3,795,030 A | * | 3/1974 | Yates et al. | 24/637 |
| 3,807,000 A | * | 4/1974 | Weman | 24/655 |
| 5,218,744 A | * | 6/1993 | Saito | 24/303 |

* cited by examiner

Primary Examiner—Kiley S. Stoner
Assistant Examiner—Len Tran
(74) Attorney, Agent, or Firm—Thrasher Associates,LLP

(57) ABSTRACT

The invention provides methods of manufacturing solid form automobile safety belt buckles with hardened tips that enable the shattering of vehicle glass. One method includes heating a polymer/plastic material to a semi-fluid state (the material being heated just enough to melt and ensure uniform and complete distribution and composition and minimal porosity), injecting the material with pressure into a mold and then releasing the molding of the finished product. Another method involves ladling molten metal into a mold/die lined with a heat resistant material, under pressure and releasing the finished product. A third method involves applying heat to a metal and hammering or otherwise compressing the material into the desired form. A fourth method uses an open mold and molten metal or alloy is poured into the bottom of the mold and the top is closed to ensure uniformity and accuracy in the form of the final product.

5 Claims, 2 Drawing Sheets

SOLID FORM SEAT BELT BUCKLE AND ESCAPE TOOL

TECHNICAL FIELD

The invention relates to apparatuses for shattering glass to facilitate escape from a vehicle, and, more particularly, the invention relates to methods of manufacturing an apparatus that can shatter vehicle glass.

PROBLEM STATEMENT

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

During emergencies, persons may become trapped in a vehicle due to a wide variety of circumstances. For example, due to poor driving or to poor road conditions, a person may drive a car into a body of water, such as a reservoir, lake, or flooded street, thereby trapping the occupants of the vehicle inside. In yet other circumstances a vehicle occupant may be trapped inside a car as a result of an accident. Occasionally, vehicles catch fire due to electrical problems or as a result of accidents and burn any occupants who are trapped inside. Whether due to fire, flood, or other trapping, vehicle occupants need a means for escape in the event they are trapped inside and face potential danger.

When doors and windows are jammed in an emergency situation, it is necessary to shatter a window so that the occupants can escape. Tools that shatter vehicle glass exist, but these tools suffer the disadvantages of multiple components that are expensive and time-consuming to form separately and then join. Additionally, window-shattering tools made of multiple parts may become separated over time through rough use or improper care. Prior-art apparatuses that have the ability to shatter vehicle glass suffer from at least the disadvantages that they are made in a complex and expensive process, and that they are made of a plurality of components, such as a separate tip and buckle. When in use, the tip may separate from the buckle, thus making the tip unavailable for emergencies. In addition, the tip may separate from the belt buckle during an impact. Thus, the tip may separate from the buckle at the very moment it is needed most. Thus, it is desirous to provide a vehicle window-shattering tool that is effective, easily used in an emergency, and made using a single, solid form. The present invention provides methods of manufacturing such systems and devices.

SELECTED OVERVIEW OF SELECTED EMBODIMENTS

The invention provides technical advantages as methods of manufacturing solid form apparatuses that enable the shattering (or dicing) of a vehicle window. One method for manufacturing a solid form apparatus for dicing an automobile windshield with a buckle having a tip provides for the injection of a plastic/polymer into a mold that forms the apparatus as a single unit. Other methods provide for the use of certain metals or alloys and include various other methods for casting or forging the apparatus. Accordingly, the invention provides advantages over the prior art as an accessible and effective window-dicing means that enables a vehicle occupant to escape in the event of an emergency.

Of course, other features and embodiments of the invention will be apparent to those of ordinary skill in the art. After reading the specification, and the detailed description of the exemplary embodiment, these persons will recognize that similar results can be achieved in not dissimilar ways. Accordingly, the detailed description is provided as an example of the best mode of the invention and it should be understood that the invention is not limited by the detailed description. Accordingly, the invention should be read as being limited only by the claims.

BRIEF DESCRIPTION OF THE DRAWINGS

Various aspects of the invention, as well as an embodiment, are better understood by reference to the following EXEMPLARY EMBODIMENT OF A BEST MODE. To better understand the invention, the EXEMPLARY EMBODIMENT OF A BEST MODE should be read in conjunction with the drawings in which.

AN EXEMPLARY EMBODIMENT OF A BEST MODE

Figure 1:
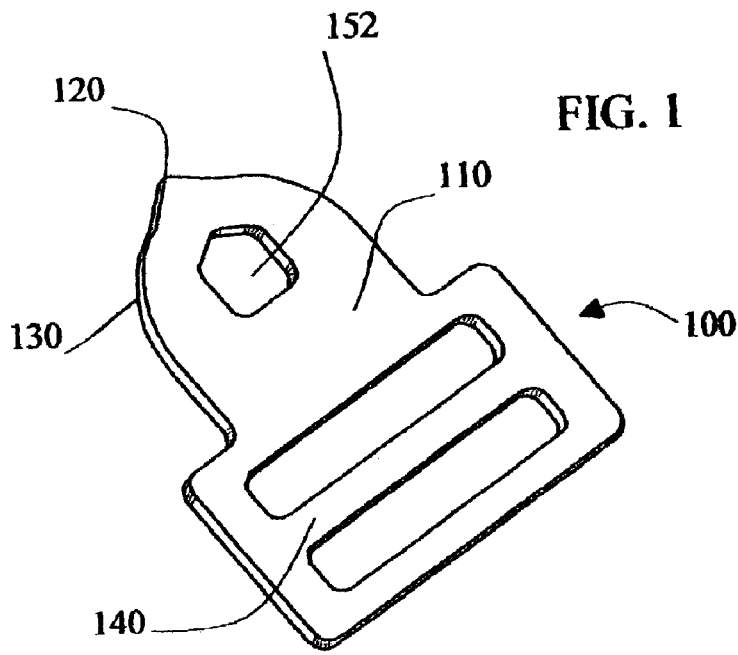
FIG. 1 shows one embodiment of a solid form seat belt having a hardened tip capable of dicing an automobile windshield.

The invention provides inventive embodiments that allow for a method of manufacturing a solid form seat belt buckle (the buckle) with a hardened escape tool, which is preferably embodied as a tip capable of dicing an automobile windshield. In one embodiment, the invention is a method of manufacturing the buckle with a tip by injecting a polymer/plastic into a mold. Other embodiments are discussed, such as metallic mold-forming, die casting, and soft-form mauling.

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment. Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in 112, paragraph 6 of 35 U.S.C., unless used as "means for functioning" or "step" for—functioning- "in the Claims section.

Exemplary Device

Better understanding of a method of manufacturing the apparatus (device) can be gained by first examining the device itself. FIG. 1 shows one embodiment of a solid form seat belt buckle 100 having a hardened tip 120 capable of dicing an automobile windshield. Accordingly, the solid form seat belt buckle (the buckle) 100 is manufactured as a single unit of a hardened material, and includes the tip 120 as contiguous portion of the buckle 100. In the present embodiment, the buckle 100 is shown as having a belt bar 140, which is capable of receiving a belt (not shown) and capable of loosely securing the buckle 100 to the belt. This type of buckle is commonly found in automobiles having "automatic" seatbelts.

Although the buckle 100 in this drawing slides across a belt, in other embodiments a buckle can be fastened securely to the belt (the defining feature of a buckle is that it is adapted to be inserted into a seat-belt receptacle, and locked therein via a hole 150 in the buckle 100). It should be noted that the buckle 100 has a generally planar surface 110, and a width 130 that imbues the buckle 100 with the strength and stability.

Figure 2:
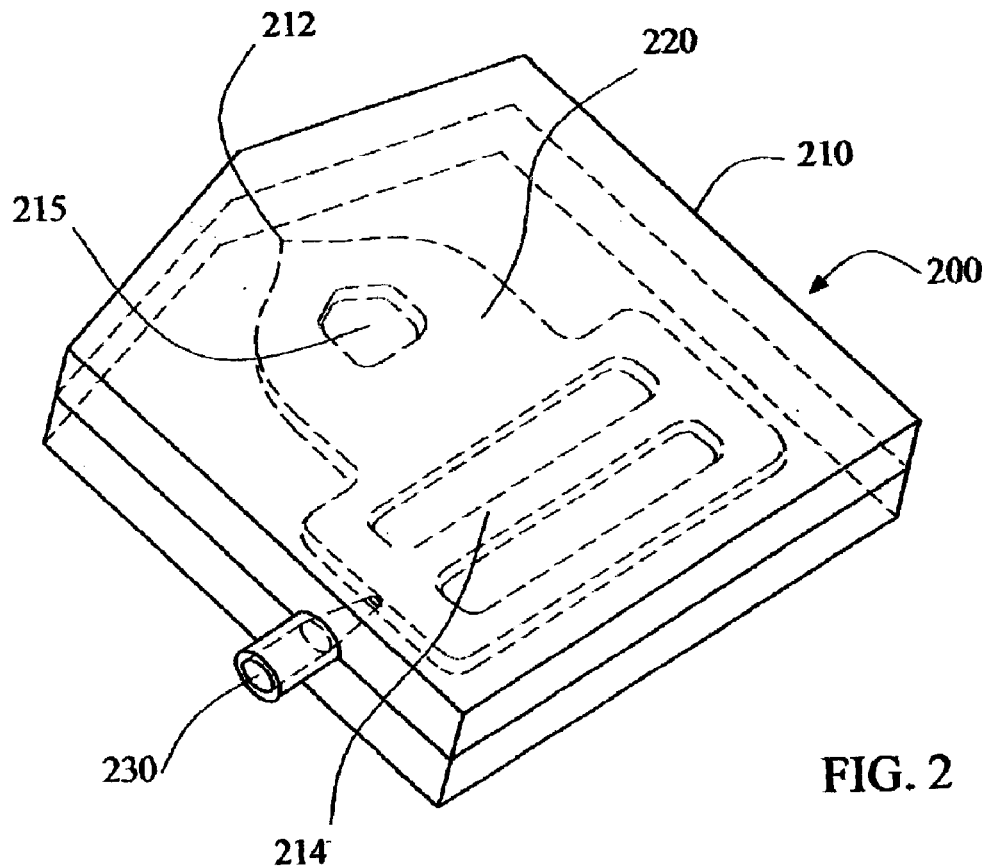
FIG. 2 illustrates one embodiment of a cavity for a mold (or die) for manufacturing a solid form seat belt buckle with a hardened tip.

Still better understanding of the invention can be gained by examining an exemplary cavity that can be adapted for a variety of manufacturing processes. Accordingly, FIG. 2 illustrates one embodiment of a cavity 220 for a mold (or die) 200 for manufacturing a solid form seat belt buckle with a hardened tip. Thus, the mold 200 receives and gives shape to a material that becomes a solid form seat belt buckle. A mold casing 210 may be used to contain and form the material in the cavity 220. Of course, the cavity 220 has the shape of a seat belt buckle and escape tool (tip) 212, including a belt bar 214, and hole 215. The cavity also includes, in a preferred embodiment, an inlet 230 for accepting the material from which the buckle is to be made.

Preferably, the material will be injected or poured into the cavity 220 when the material is in a semi-fluid state. Furthermore, in practice, pressure sufficient to ensure complete distribution of the material is applied using a plunger or some other technique, and the inlet 230 is adapted to receive such a plunger (not shown, though well known to those of ordinary skill in the art). Of course, alternative forms of distribution of the material can also be used, and are readily known by those of ordinary skill in the art. For example, the mold may be hinged or otherwise seperated to allow the material to be ladled into the bottom half and then the top half is closed with enough force to provide complete distribution and the desired porosity.

Figure 3:
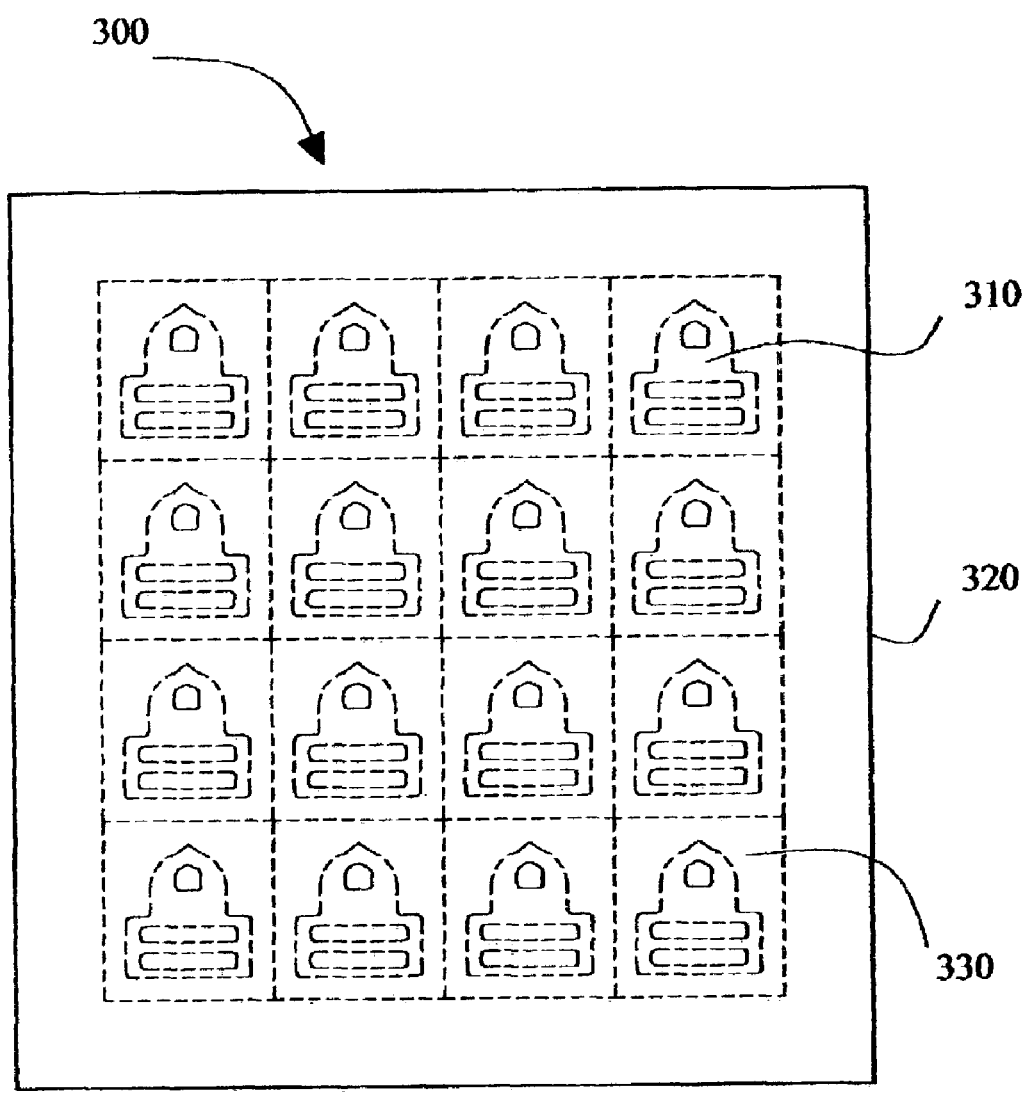
FIG. 3 is a multi-cell mold (or die) wherein multiple molding cells are illustrated, each capable of producing a solid form seat belt buckle with a hardened tip.

Furthermore, the invention can be adapted to create more than one buckle at a time by using more than one cavity in a mold. Accordingly, FIG. 3 shows a multi-cell mold (or die) 300 having a plurality of molding cells for producing a buckle having a co-formed escape tool. Thus, each cavity 310 is capable of producing a solid form seat belt buckle with a hardened tip. Accordingly, FIG. 3 is a mold 300 with multiple molding cells 330 surrounded by the mold casing 320, each mold cell having a cavity 310 that is adapted to produce a solid form seat belt buckle and escape tool.

Exemplary Methods

A polymer/plastic form of a seatbelt buckle (the buckle) may be manufactured by at least the acts of heating a polymer/plastic to a semi-fluid state, injecting the polymer/plastic into a mold with significant pressure to completely fill a buckle-shaped cavity, hardening the buckle molding as it is allowed to cool, and then releasing the buckle molding from the mold. The semi-fluid state of the material is preferably achieved by heating pellets of a plastic/polymer such as acrylonitrile-butadiene-styrene (ABS). Typically, semi-fluidity is accomplished by feeding the material from a screw feeder to the mold, and melting the material (typically pellets) just enough to allow uniformity of viscosity (to permit the pour of the ABS into the mold), and to allow the complete filling of all parts of the cavity.

The hardened material may be a polymer/plastic, for example high-density polyethylene (a hard and impact resistant material), or other material hard enough to break vehicle glass, the selection of such materials being well known to those of ordinary skill in the art. Thus, in addition to ABS, the hardened material can also be some other high density, high impact polymer/plastic capable of dicing an automobile window.

Another method of manufacturing a buckle employs ladling metal in a molten state into a cold chamber (cavity) of a metal mold (die). The cold chamber is preferably lined with a heat resistant material (clay, sodium silicate, or some other material with heat resistant properties). In the present invention, the cold chamber cavity is buckle and escape tool (tip) shaped.

The present embodiment may be a stainless steel, or a steel alloy such as: aluminum, silicon, and copper; aluminum, zinc, and copper; or some other combination of metal elements that together form a hardened material as is known in the art, such that the material is of a hardness (in the solid state) capable of dicing an automobile window. Preferably, ladling is done quickly and the molten metal is positioned to decrease the tendency of the molten metal to alloy with the parts of the plunger. Preferably next, a pressure higher than ambient pressure is induced on the metal in the mold (via plunger or some other method) to achieve uniform distribution of the metal throughout the cavity. Next, the metal is exposed to pressure in the die for an amount of time necessary to allow the metal to cool and harden, as is known to those of ordinary skill in the art. Then, the mold is released to expose at least one solid metal buckle and escape tool, which is preferably a tip.

Yet another method of manufacturing the buckle comprises an act of heating the metal in order to make the material malleable. Next, the buckle is shaped via plastic deformation by using compressive and expansive forces (by using a hammer, a vice, or some other tool). In practice, deformation strengthens the metal. Thus, eventually the buckle reaches a predetermined strength to weight ratio—yielding a material strong enough to dice an automobile windshield.

An additional method of manufacturing a buckle requires the pouring of molten metal into the bottom half of a pre-heated die, closing the upper half of the die to apply pressure, maintaining pressure with the closure of the upper half of the die until the metal hardens, and then opening the die (preferably the upper half) and releasing at least one buckle. This method works well for ferrous or non-ferrous metals, or with alloys that have the necessary hardness to dice an automobile windshield.

Similarly, a buckle may be manufactured via stamping, such as sheet metal stamping, or via the stamping of a metal plate. Additionally, a metal plate may be cut into the shape of a solid form seatbelt via a laser or a high-pressure water jet. Of course, variations of stamping and cutting are known to those of ordinary skill in the art, and will be obvious to those of ordinary skill in the art upon the reading of this disclosure.

Other materials can be used to manufacture the solid form seat belt buckle, including composite materials and alloys made from combinations of aluminum, silicon, and copper. Of course, many more material choices are known to those of ordinary skill in the art, and, upon reading this patent, these choices are readily apparent to these individuals. In addition, a choice of material may lead to variations in the methods of manufacturing discussed herein. For example, a metal may be heated and compressed to initiate the deforming process.

Alternatively, changing the initial shape of the metal may be achieved via compression (the compression shifts the relative position of parts of the metal, and is well-known in the art of metallurgy—this process is known as plastic deformation). In this process, the metal is compressed into the appropriate shape using hammer, vices, or other techniques. Of course, upon reading this disclosure, many variations and alternatives to the teachings herein will become obvious to those of ordinary skill in the art, and without departing from the scope of the claims, these variations are incorporated in the teachings of this patent.

Though the invention has been described with respect to a specific preferred embodiment, many variations and modifications will become apparent to those skilled in the art upon reading the present application. The appended claims are to be interpreted as broadly as possible in view of the prior art to include all such variations and modifications.

I claim:

1. A method of manufacturing a solid form seat belt buckle (the buckle), the buckle being enabled to dice an automobile windshield, comprising:

ladling metal in a molten state into a cold chamber of a metal mold (die), the cold chamber being lined with a heat resistant material and the cold chamber having at least a tip portion and a seatbelt portion in fluid communication with the tip portion, the tip portion shaped such that the tip formed therefrom may shatter a windshield when the tip portion strikes the windshield with at least seven pounds of force;

inducing a first pressure, the first pressure higher than ambient pressure on the metal in the metal mold;

exposing the metal in the die to the first pressure for a predetermined period of time; and releasing the mold to expose the metal, the metal now forming a solid metal buckle.

2. The method of claim 1, wherein the predetermined time is the amount of elapsed time necessary to completely fill the die and allow the metal to start solidifying.

3. The method of claim 1, wherein the heat resistant material is clay, sodium silicate, or some other heat resistant material.

4. The method of claim 1, wherein the ladling provides less exposure to the plunger, reducing the tendency of the molten metal to alloy with the parts of the plunger.

5. The method of claim 1, wherein the metal is an alloy of aluminum, silicon, and copper; aluminum, zinc, and copper; or some other combination leading to a hardened material, capable of dicing an automobile window.

* * * * *